United States Patent [19]

Flautt, Jr.

[11] 4,100,017

[45] Jul. 11, 1978

[54] MULTI-PLY TISSUE PRODUCT

[75] Inventor: Thomas Joseph Flautt, Jr., Cincinnati, Ohio

[73] Assignee: The Procter & Gamble Company, Cincinnati, Ohio

[21] Appl. No.: 724,885

[22] Filed: Sep. 20, 1976

Related U.S. Application Data

[63] Continuation of Ser. No. 574,840, May 5, 1975, abandoned.

[51] Int. Cl.² .............................................. D21H 5/24
[52] U.S. Cl. ................................... 162/111; 162/113; 162/125; 428/154
[58] Field of Search .............. 162/109, 111, 117, 112, 162/125, 132, 113, 123; 428/154, 178, 180, 166; 128/284

[56] References Cited

U.S. PATENT DOCUMENTS

| 3,301,746 | 1/1967 | Sanford et al. | 162/117 |
| 3,650,882 | 3/1972 | Thomas | 428/154 |
| 3,738,905 | 6/1973 | Thomas | 428/154 |
| 3,940,529 | 2/1976 | Hepford et al. | 162/112 |

*Primary Examiner*—S. Leon Bashore
*Assistant Examiner*—Peter Chin
*Attorney, Agent, or Firm*—John M. Pollaro; Fredrick H. Braun; Richard C. Witte

[57] ABSTRACT

Sanitary tissue products which are laminates formed from two dissimilar paper webs. When a web of low density, high bulk process paper is united with a web of conventional paper, a product possessing absorbency softness, flexibility, and bulk properties similar to those of a product comprising two webs of the low density, high bulk process paper is produced. Variations taught by the invention include the use of two paper webs having different creping characteristics to form the laminated sanitary tissue. The teachings of the invention can be extended to other products such as paper towels.

13 Claims, 6 Drawing Figures

MULTI-PLY TISSUE PRODUCT

This is a continuation, of application Ser. No. 574,840, filed May 5, 1975 now abandoned.

BACKGROUND OF THE INVENTION

1. Field of the Invention

This invention relates to sanitary tissue products.

2. Description of the Prior Art

Sanitary tissue products, which are also called bathroom tissue and toilet tissue products, generally fall into one of four categories based on their composition and structure: One ply of conventional paper web; two-ply laminate of conventional paper webs; one ply of high bulk process, low-density paper web such as produced by the process described in U.S. Pat. No. 3,301,746 issued to Sanford and Sisson on Jan. 31, 1967; and two-ply laminate of high bulk process paper webs. These products are usually produced and marketed in roll form with individual sheets of the tissue defined by perforations extending across the width of the tissue product which is wound lengthwise on a hollow core.

Sanitary tissue products are generally evaluated by consumers in terms of softness, absorbency, flexibility, bulk, and, to a lesser degree, strength. Softness is that quality of the tissue manifested by a cushioned, resilient, non-harsh, pleasant sensation to the fingers or other portions of the human anatomy. Absorbency is, as the term applies, the ability of the tissue to absorb moisture. Flexibility is the ease with which the tissue bends during use. Bulk is a measure of the thickness of the sheet and is manifested in several ways such as by the tactile sensation produced by the tissue and by the diameter of a roll of a given number of standard size sheets. Bulk is, of course, inversely related to density. Strength is the ability of the sanitary tissue to resist tearing during use. Strength is also manifested by the ability of the sanitary tissue to be separated into its individual sheets by disjointing the web at the perforations without tearing the remainder of the sheet. While the five attributes hereinbefore mentioned have been treated as separate entities, they are, in fact, interrelated. For example, bulk contributes to the softness and softness impression of the sanitary tissue as does flexibility. Bulk also enhances the absorbency impression of the tissue as well as being objectively related to absorbency for physical reasons.

FIG. 1 is a representation of the cross-section of a sheet of creped paper web 11 used in making sanitary tissues. In this drawing, the thickness of the material and the degree of creping are both highly exaggerated. It is possible to define two thicknesses for this paper web. The first, represented by T in FIG. 1, is the true, inherent thickness of the web. The maximum distance between the tops of the peaks and the bottoms of the valleys of the creped web, as represented by t in FIG. 1, is a more practical measure of thickness and is denominated caliper. Caliper is used throughout this specification and is measured under load as hereinafter described.

Sanitary tissue products made from one ply of conventional paper web are generally characterized as being harsh and stiff. They are especially noted for their lack of absorbency. All three of these less than desirable attributes result from the necessity of making a paper web which is strong enough to withstand ordinary use. In general, there are two ways to increase the strength of a paper web: using synthetic resins and increasing the basis weight (weight per standard area) of the web. Since sanitary tissue must be readily dispersable in water, the use of synthetic resins is limited to dry strength resins which significantly increase the harshness of a paper web. In sanitary tissues, the strength of the web is generally increased by increasing the basis weight of the web; increasing the basis weight of a paper web increases its stiffness and harshness. In addition, the bulk of a one ply conventional paper web product is, and is perceived as being, low because of the inherent inability of conventional paper machines to make a paper web of low density. As indicated above, the lack of bulk is related to the poor absorbency of this tissue product.

Sanitary tissue products constructed of one ply of high bulk process paper web are generally considered to be an improvement over one ply conventional paper web sanitary tissues in terms of softness and absorbency. This improvement generally results because of the ability of the high bulk process (hereinafter described) to make a paper web of significantly lower density than that which may be made on conventional paper machines. Lower density inherently leads to greater absorbency and greater softness. Lower density also, of course, inherently means greater bulk which not only adds to the softness impression of the product but also results in a much thicker roll of product. Since decreased density inherently results in decreased strength of the web, the best combination of softness and absorbency is impossible to obtain with a single ply high bulk process tissue because of the necessity of maintaining adequate product strength.

Sanitary tissue products made from two conventional paper webs laminated to form a two-ply tissue product are generally softer, more absorbent, and have greater bulk impression overall than do sanitary tissue products made from a single ply of either conventional or high bulk process webs. The desirable qualities of the two-ply conventional web product results in the ability to use webs of lower basis weight than can be used in one ply products. As noted above, a web of lower basis weight generally results in a softer, more flexible web than does a higher basis weight. The strength of the web is reduced as basis weight is reduced, but by laminating two webs together it is increased to an adequate level. As is well known to those skilled in the art, laminating two webs to make a product generally increases the absorbency of the product. It must be noted that laminating two webs of a given caliper does not result in a product having a caliper twice that of the individual web. As is well known, and as shall be more fully discussed hereinafter, there is a caliper loss on lamination.

Sanitary tissues made from two plies of high bulk process paper web are generally considered to be an improvement over products made from two plies of conventional paper webs. The same considerations, discussed above, that combine to result in increased softness and absorbency when two conventional webs are laminated to form a single sanitary tissue product apply when two high bulk process webs are so laminated. The use of two-ply sanitary tissues made from high bulk process paper webs is not more common because of problems of supply. Paper machines designed and constructed to make high bulk process webs are very expensive, as are all paper machines, and are not yet common throughout the paper industry. Consequently, the supply of high bulk process paper is not yet adequate to supply the demand for both one ply and two ply products. Economic considerations have dictated that the major part of the supply of high bulk process paper be used in one-ply sanitary tissues even though these products are somewhat less desirable in certain attributes than are two-ply tissues made from the high bulk process web. At the same time, there is excess capacity available on conventional paper machines.

SUMMARY OF THE INVENTION

It has now been discovered that when one conventional paper web is laminated to one high bulk process paper web, a two-ply sanitary tissue product is formed which is in many respects equivalent to a laminate of two high bulk process webs. The resulting product is significantly thicker, softer, and more absorbent than would be expected from the prior art experience of laminating two identical webs.

It is, accordingly, an object of this invention to provide soft, absorbent, flexible, bulky, and strong sanitary tissue products.

It is a further object of this invention to make use of excess capacity of conventional papermaking machines.

Other objects shall be apparent from the detailed description contained within the following paragraphs.

DETAILED DESCRIPTION OF THE INVENTION

While the specification concludes with claims particularly pointing out and distinctly claiming the subject matter which is regarded as forming the present invention, it is believed that the invention can be more readily understood through use of the following description taken in conjunction with the accompanying drawings.

FIG. 1, noted above, is a cross sectional view of a creped paper web.

Figure 1:
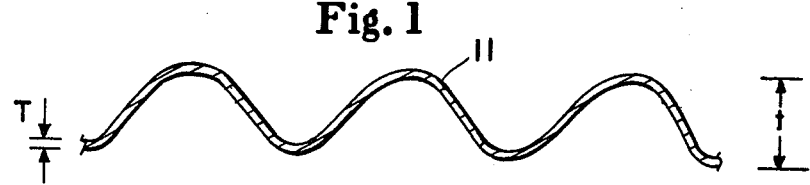

In each of the figures, the thicknesses of the webs and the overall depth of the creping patterns have been exaggerated for clarity.

It is well known to those skilled in the art that when two similar paper webs are laminated to form a single product, the caliper of the laminate is less than the sum of the calipers of the individual webs. The bulk of the product, with its associated softness impression, is thus less than that which represents the sum of the two webs. At the same time, those skilled in the art know that when two similar paper web are laminated to form a single product, the absorbency of the laminate is greater than the sum of the absorbencies of the individual webs.

It has now been discovered that when a novel sanitary tissue product is formed by laminating two dissimilar paper webs, such as a conventional paper web and a high bulk process paper web, the loss of caliper is less and the absorbency increase is greater than would be expected from the experience of the prior art. Further, the softness and flexibility of the hybrid laminate are greater than would be expected. In fact, a sanitary tissue product is formed which is in many respects equivalent to the desirable sanitary tissue product formed by the union of two high bulk process paper webs.

Conventional papermaking processes for the manufacture of paper webs for use in sanitary tissue products are well known to those skilled in the art. Briefly, a typical process involves supplying a slurry of papermaking fibers to a Fourdrinier wire or other forming surface, subjecting the moist web of fibers to an intermediate pressing operation over the entire surface of the web to mechanically expel water, smooth the web surface, and aid in development of tensile strength of the web. The web is then dried to its final water content as on the surface of a Yankee dryer. The dried web is creped from the surface of the Yankee dryer.

In the typical high bulk papermaking process, such as that taught by the hereinbefore mentioned U.S. Pat. No. 3,301,746 which is incorporated herein by reference, a moist web of papermaking fibers is carried on an imprinting fabric where it is thermally predried without substantial mechanical compaction to a fiber consistency greater than about 30 percent and ranging up to about 98 percent prior to being imprinted with the knuckle pattern of the fabric during transfer to a creping drum which, in some cases, may be a Yankee dryer. The dried web is creped from the surface of the creping drum. This high bulk papermaking process results in a paper web having improved qualities of bulk, softness, and absorbency for a given basis weight. That is to say, this high bulk process produces paper webs of much lower density than were obtainable prior to the invention described in U.S. Pat. No. 3,301,746.

As used throughout this specification, conventional papermaking processes are understood to be those processes designed to produce paper having a density of from about 0.150 gm/cc to about 0.240 gm/cc, preferably from about 0.170 gm/cc to about 0.190 gm/cc. Similarly, high bulk papermaking processes, whether following the teachings of U.S. Pat. No. 3,301,746 or any other process, are understood to be those processes designed to produce paper having a density of from about 0.070 gm/cc to about 0.140 gm/cc, preferably from about 0.096 gm/cc to about 0.124 gm/cc. Conventional paper webs and high bulk paper webs are understood to be webs having densities falling, respectively, within the above noted ranges. The basis weight of conventional paper webs ranges from about 9.5 to about 12.5 pounds per 3,000 square feet while that of high bulk process paper webs ranges from about 8.5 to about 11.0 pounds per 3,000 square feet.

Figure 2:
FIG. 2 is a cross sectional view of a creped conventional paper web. The cross section, as in all the figures, is taken looking in the cross-machine direction of the web.
Figure 3:
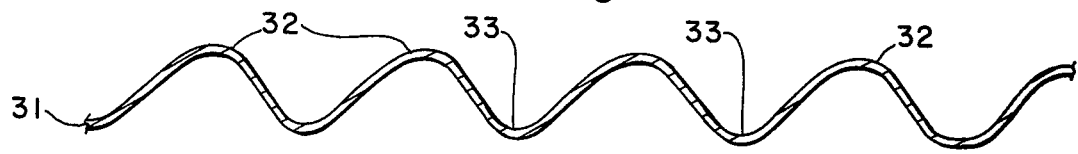
FIG. 3 is a cross sectional view of a high bulk process paper web.

It is important to note that a major difference between paper webs made by the conventional papermaking process resides in the characteristics imparted to the respective webs during the creping operation. In the conventional paper web, the hills and valleys imparted to the web by the creping process are more or less random wrinkles within the web and are relativly shallow as illustrated in FIG. 2. (In FIG. 2 as in all the figures, the thickness of conventional paper web 21 and the vertical distance between peaks 22 and valleys 23 is exaggerated for illustrative purposes.) On the other hand, the hills and valleys imparted to the high bulk process paper web because of the combination of imprinted knuckle pattern and the creping process are regular, evenly spaced, and of even amplitude as illustrated in FIG. 3. Reference number 31 indicates the web, 32 the peaks and 33 the valleys of the creping pattern.

The combining of two webs into a sanitary tissue product is accomplished by processes well known to those skilled in the art. In general, the two separate webs are conducted to the nip between two pressure rolls wherein the two webs are laminated by mechanical pressure The laminate is then perforated by well known means to provide deliberate lines of weakness for separating the laminate into individual sheets, and the perforated laminate is wound onto a hollow core which is typically a cardboard tube. The laminate is typically 4.5 inches (11.4 cm.) wide; the lines of perforations are typically 4.5 inches (11.4 cm.) apart. Typically, 300 to 500 sheets constitute a single roll of product.

As will be fully described in the examples below, the lamination of two dissimilar webs, one of conventionally made paper and the other of high bulk process low density paper, results in a tissue product having properties very nearly like that formed by laminating two webs of high bulk process paper. It would normally be expected that the properties of the hybrid product would be very nearly the average of the properties of the two laminates formed by like pairs of the component webs.

While not wishing to be bound by any theoretical considerations, it is believed that this surprising result can be described as follows.

As illustrated in FIGS. 2 and 3, the creping operation causes a pattern of wrinkles to form in paper webs. When two webs are laminated, the hills and valleys of the creping pattern tend to fit, or nest or mesh, together to a greater or lesser extent depending on the configuration of the creping pattern. This nesting or meshing causes the hereinbefore mentioned caliper loss on lamination.

Figure 4:
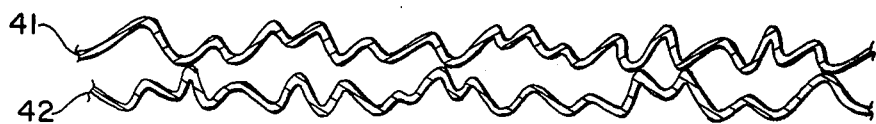
FIG. 4 is a cross sectional view of a sanitary tissue formed by laminating two conventional paper webs.

As illustrated in FIG. 2, the creping pattern of conventional paper webs is more or less random in nature. As illustrated in FIG. 4, conventional paper webs 41 and 42 are significantly prevented from meshing by the randomness of the creping pattern.

Figure 5:
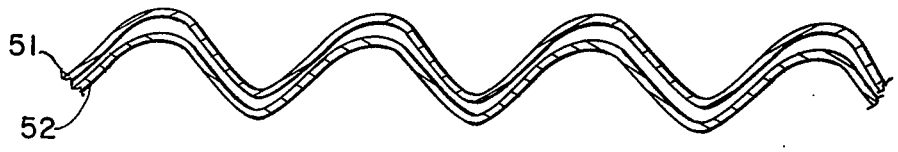
FIG. 5 is a cross sectional view of a sanitary tissue formed by laminating two high bulk process paper webs.

High bulk process paper webs, as shown in FIG. 3, have a very regular creping pattern with relatively high hills and deep valleys. FIG. 5 illustrates how high bulk process webs 51 and 52 tend to mesh together with the resultant large caliper loss on lamination. No laminating glue or adhesive is used in sanitary tissue products; the two webs are free to move relative to one another over limited distances. Should the webs be brought into laminating position with the valleys of the uppermost web oriented over the hills of the lower web, the webs would tend to move relative to one another so as to assume the most stable alignment. It is apparent that this most stable alignment would be the position of maximum nesting.

Figure 6:
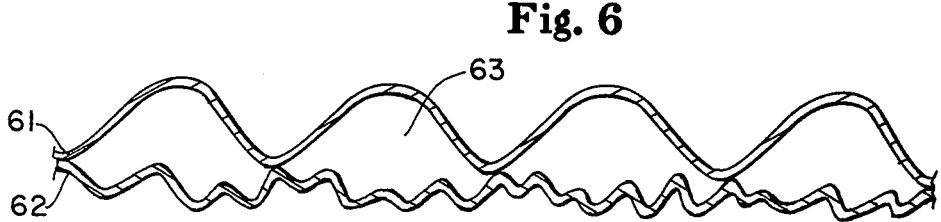
FIG. 6 is a cross sectional view of a sanitary tissue formed by laminating a high bulk process paper web and a conventional paper web.

When two dissimilar webs such as conventional paper webs and high bulk process paper webs are laminated, the random creping pattern of the conventional paper web prevents nesting of the two. This is illustrated in FIG. 6 where 61 indicates the high bulk process paper web and 62 the conventional paper web. The net result is a product with significantly less caliper loss on lamination than obtains when two high bulk process paper webs are laminated. Because any orientation of the creping pattern of the two webs is as stable as any other orientation, slight relative movement between the two webs does not alter the result.

It is apparent from FIG. 6 that when nesting or meshing is prevented, the relative size of the void spaces 63 between the webs increases. These void spaces doubtless contribute to the enhanced absorbency of the laminate and to its overall softness.

In the discussion of the examples below, the following test methods and definitions are used.

Caliper, t, is a measure of the apparent thickness of a web or of a laminate formed from two or more webs; it is discussed above and is illustrated in FIG. 1. Caliper is measured with a motor-operated micrometer such as the Model 449-27, Series 400 micrometer manufactured by Testing Machines, Inc., of Amityville, New York. It is measured under a load of 80 grams per square inch (12.4 grams per square centimeter) with an anvil 2 inches (5.08 centimeters) in diameter. Prior to measuring caliper, the web is conditioned at 73°±2° F. (22.8°±3.6° C) at 50±2 percent relative humidity. In this specification, caliper is expressed in mils (thousandths of an inch).

Percent caliper is an indication of caliper loss on lamination. The caliper of the laminate is divided by the sum of the calipers of its component webs and the quotient is multiplied by 100. The higher the percent caliper, the smaller is the caliper loss on lamination.

Basis weight as used in this specification is the weight in pounds of 3,000 square feet of the web or of laminate comprising two or more webs.

As used herein, density is the bulk density of a web or a laminate and is obtained by dividing the basis weight of the web or the laminate by the caliper (apparent thickness) of the web or laminate. Bulk density is expressed in grams per cubic centimeter (g/cc). If the quotient obtained by dividing the basis weight of a web or laminate in pounds per 3,000 square feet by the caliper in mils is multiplied by the conversion factor 0.064, bulk density in g/cc is obtained.

Absorptive capacity is expressed in terms of grams of water retained by the web or laminate divided by the weight of the web or laminate in grams. To obtain the absorptive capacity, ten sheets of web or laminate, as the case may be, are arranged in a stack. The stack is trimmed so as to provide a square test unit 4 inches (10.2 centimeters) on a side. The weight of the test unit is obtained. The test unit is placed in the center of a plane inclined at approximately 30°. Water is allowed to run down the inclined plane and through the test unit until the unit is saturated and water drains freely from the unit. The rate of water flow down the incline plane is adjusted so that 500 milliliters flow through the unit in one minute. Water flow is stopped and the test unit is allowed to drain for 45 seconds. The saturated unit is then weighed and the weight of absorbed water is calculated. This latter weight is divided by the dry weight of the test unit to determine absorptive capacity.

Two quantities which measure the stiffness of a web or laminate are flexural rigidity and bending modulus. These values are obtained through the use of a device such as the Shirley Stiffness Tester described in ASTM Standard Method NO. 1388 which is incorporated herein by reference.

In the test described in Method NO. 1388, a section of web or laminate is cut into a rectangle 1 inch by 6 inches (2.5 by 15.2 cm.). This test specimen is placed on the horizontal surface of the Shirley Stiffness Tester. The test specimen is slowly moved so that the narrow edge of the specimen is extended beyond the edge of the horizontal surface of the Stiffness Tester. The specimen of web or laminate will begin to droop or sag as it is extended beyond the edge of the horizontal surface; it is extended until its leading edge droops through an angle of 41.5° as indicated by the index on the Stiffness Tester. The length of specimen overhanging the edge, overhang length L, is measured in centimeters.

Flexural rigidity and bending modulus are based on the bending length, c, which is related to overhang length L by the following relation:

$$c = f(\theta) L$$

where $\theta$ is the angle through which the specimen bends and $$f(\theta) = [\cos 0.5\theta \div 8 \tan \theta]^{1/3}$$

When $\theta$ is 41.5° as in Method NO. 1388, $f(\theta)$ is 0.5. The definition of c then reduces to $$c = 0.5 L.$$

Bending length is expressed in centimeters.

Flexural rigidity, G, is a measure of stiffness of the sample and is defined for present purposes as $$G = 0.1629 (B.W.) c^3$$

wherein c is bending length defined above, in cm., and (B.W.) is the basis weight of the web or laminate in pounds per 3,000 square feet of web or laminate. The units of G are milligram-centimeters.

Bending modulus, Q, is independent of the dimensions of the specimen tested and may be regarded as the intrinsic stiffness of the material. It is more useful then flexural rigidity for comparing samples of different apparent thicknesses and is used in this specification. It is by definition the Young's modulus along the axis of the specimen. For present purposes, bending modulus can be expressed as:

$$Q = 732G/t^3$$

where $t^3$ is the caliper of the sample in mils. The units of Q are kilograms per square centimeter.

Bending modulus is a measure of the stiffness of a sample. In the evaluation of sanitary tissues, the lower the bending modulus, the more acceptable is the product to the consumer in terms of flexibility. In the examples which follow, the reported values of bending modulus are the geometric means of four measurements made on each laminate. Because the laminates of this invention comprise two plies of dissimilar webs, and because the measured bending modulus depends on the vertical ordering of the webs in relation to the Stiffness Tester, it is necessary to measure bending modulus with each web uppermost. In addition, because of the well known fact that properties of paper webs differ in the machine and the cross-machine directions, it is necessary to evaluate the bending modulus of the laminates in the two directions. Therefore, two measurements (one in the machine direction and one in the cross-machine direction) are made with one side of the laminate uppermost and two measurements are made with the other side of the laminate uppermost.

Softness is evaluated in a series of paired comparison tests by a panel of at least ten trained, experienced judges. In this test, each judge crumples samples of sanitary tissue products (5 sheets, 4.5 inches square, of single ply products or 4 sheets of two ply products) in his hand and subjectively evaluates the softness difference between the products. The judge determines which product is softer and assigns a grade of from 0 to 4 to the difference in softness between the products. The grades of all the judges for all the product pairs are analyzed by standard statistical methods.

Results of the softness evaluation are reported in terms of panel score units (PSU). One product is designated the standard and is assigned a value of 0. Positive deviations in PSU from this standard, or between any two products, represent an increase in softness. A minimum difference of 0.5 PSU between two products is usually found to be statistically significant at the 95 percent confidence level.

These measured and calculated properties are used in the descriptions of the invention and the prior art embodied in the following examples.

EXAMPLE I

Paper webs were made on conventional paper machines by processes well known in the art. The fiber furnish for each web consisted of 40 percent northern softwood kraft and 60 percent northern hardwood sulfite pulps. Several operating runs were made on several machines to produce several conventional paper webs. In each operating run, process variables were controlled in an attempt to insure that each conventional web produced was as nearly as possible identical to every other conventional web produced. Within the normal variation of papermaking processes, the objective was accomplished. Random samples of conventional paper webs from the several runs were selected and used to form sanitary tissue products comprising two conventional paper webs united into a single laminate. Converting of the conventional webs into two-ply tissue was accomplished by passing them together through the nip between two pressure rolls. The selection and lamination processes were repeated so as to form three separate samples of laminates which are denominated IA, IB, and IC. The basis weight of the laminate, the caliper of the laminate, the caliper of the individual conventional webs, the percent caliper of the laminate, and the bending modulus of the laminate are shown in the Table.

EXAMPLE II

Paper webs were made on a high bulk process paper machine by the techniques described in the Sanford and Sisson patent hereinbefore incorporated. The fiber furnish for each web was the same as used in Example I. The webs laid on the forming surface were transferred to an imprinting fabric characterized by having a 36 by 30 square mesh configuration. The webs were thermally predried to approximately 65 percent consistency. The knuckle pattern of the imprinting fabric was impressed into the webs as they were transferred to the surface of a Yankee drier. A creping adhesive was used to adhere the webs to the surface of the Yankee. The dried webs were creped from the surface of the Yankee in such a manner, well known to those skilled in the art, so as to impart from about 12 to about 16 percent crepe to the dried high bulk process web. Several operating runs were made on the high bulk process paper machine to produce several different high bulk process paper webs. In each operating run, process variables were controlled in an attempt to insure that each high bulk process web produced was as nearly as possible identical to every other high bulk process web produced. Within the normal variation of papermaking processes, the objective was accomplished. Random samples of the high bulk process web from the several operating runs were selected and used to form sanitary tissue products comprising two high bulk process webs united into a single laminate as in Example I. The selection and lamination processes were repeated so as to form three separate samples of laminates which are denominated IIA, IIB, IIC. As in Example I, measured and calculated properties are shown in the Table.

EXAMPLE III

Random samples of conventional paper webs as described in Example I and random samples of high bulk process webs as described in Example II were selected and used to form hybrid sanitary tissue products. One sample of conventional paper web and one sample of high bulk process paper web were united as in Examples I and II to form a two-ply hybrid laminate. The procedure was repeated so as to form samples IIIA, IIIB, and IIIC. As in Examples I and II, the measured and calculated properties are shown in the Table.

An examination of the percent caliper column of the Table indicates that the laminates formed from two webs of high bulk process paper have relatively greater caliper loss on lamination than do the laminates formed from two webs of conventional paper. The percent caliper values also indicate that the hybrid laminates, Samples III, are subject to caliper loss on lamination, but this loss is significantly less than the loss experienced by the high bulk process laminates of Samples II. Further, the percent caliper of the hybrid laminate is higher than one would expect based upon the average of the calipers of the laminates of Samples I and II.

An examination of the absorptive capacity column of the Table indicates much the same situation prevails here as with the percent caliper data.

The most unexpected result obtained by forming a hybrid laminate as described in this specification, and the one which indicates the degree of improvement over the prior art, is the greatly enhanced softness of the hybrid laminate as compared to the all conventional paper laminate. Heretofore, it has been thought that a sanitary tissue comprising two webs of high bulk process paper represented the softest practical product. Sanitary tissue comprising two webs of conventional paper, while acceptable to consumers, has been consistently judged less soft than those comprising two webs of high bulk process paper. This situation is illustrated by the relative softness grades of Sample IIC and Sample IC. An examination of the softness grade for Sample IIIC, the hybrid laminate, indicates that the difference between its softness and that of Sample IIC is insignificant. The meaning of this result is that the practice of this invention results in the creation of a product the softness of which is indistinguishable from the softness of the heretofore believed softest product.

While the preceding discussion has been directed primarily to sanitary tissue products comprising a web of high bulk process paper united with a web of conventional paper, and that is the preferred embodiment of the invention, it will be apparent to those skilled in the art that the basic invention can be extended to other laminates formed from other webs and to other products. For example, the invention has been described in terms of webs which, by their very nature, have different creping patterns. Similar results can be obtained through the use of two conventional paper webs or two high bulk process paper webs which have been individually and differently treated so as to have distinctive creping characteristics. The natural, or induced, crep-

TABLE

| Sample | Caliper(mils) | | | | Basis Wt.$^d$ | Absorptive Capacity | Q | Softness |
|---|---|---|---|---|---|---|---|---|
| | 1st Ply$^a$ | 2nd ply$^b$ | Laminate | % Caliper$^c$ | | | | |
| IA | 3.1 | 2.8 | 5.8 | 98.3 | 20.0 | 11.4 | 59.6 | |
| IB | 3.1 | 2.8 | 5.8 | 98.3 | 20.0 | 12.1 | — | |
| IC | 3.9 | 4.1 | 7.3 | 91.2 | 19.5 | 12.3 | 73.6 | −1.3 |
| IIA | 4.7 | 4.7 | 8.1 | 86.1 | 17.6 | 19.9 | 53.5 | |
| IIB | 5.4 | 5.3 | 8.7 | 81.3 | 17.9 | 20.0 | 51.6 | |
| IIC | 6.1 | 5.9 | 9.5 | 79.2 | 18.0 | 19.7 | 49.8 | 0 |
| IIIA | 3.9 | 6.3 | 9.6 | 94.1 | 19.7 | 16.7 | 25.6 | |
| IIIB | 4.1 | 5.8 | 9.5 | 96.0 | 19.9 | 16.7 | 33.0 | |
| IIIC | 4.5 | 6.5 | 9.6 | 87.3 | 19.2 | 17.1 | 35.1 | −0.2 |

Note:
$^a$conventional web in Samples III
$^b$special process web in Samples III
$^c$100 (laminate caliper ÷ sum of web calipers)
$^d$of the laminate The absorptive capacity of the hybrid laminates, Samples III, is less than that of the high bulk process laminates, Samples II, as would be expected since the hybrid laminates contain webs of relatively low absorbency conventional process paper. The absorptive capacity of the hybrid laminates is significantly higher than the conventional web laminates, Samples I, as would be expected since one ply of the hybrid laminates is relatively high absorbency high bulk process paper. The absorptive capacity of the hybrid laminates is significantly closer to that of the all high bulk process laminates than one would expect from the absorptive capacities of the conventional paper and the high bulk process paper laminates.

The bending modulus data indicate that, surprisingly, the flexibility of the hybrid laminates is much greater than that of either of the other two laminates. This result is surprising in that a relatively stiff conventional paper web is used in the hybrid laminates.

ing patterns can be enhanced or diminished by mechanical embossing or calendering.

The preceding description has been concerned with sanitary tissue products which by their nature must be dispersable in water and, consequently, which are made without significant quantities of strength enhancing resins. Paper towels and similar products can be made following the teachings of this invention if the dissimilar webs are made from fiber furnishes containing strength enhancing additives such as wet-strength resins. Examples of suitable wet-strength resins include the well known urea formaldehyde and melamine formaldehyde resins.

Similarly, the foregoing discussion has been limited to laminates comprising two paper webs. Analagous results can be obtained through the use of three webs, two of which are similar to each other and one of which is different from the other two. As an example, a web of conventional paper can be laminated between two webs of high bulk process paper so as to form a three-ply laminate. The same inventive concept can be used to form multi-ply laminates by alternating with webs used to make up the laminate so that each successive web is dissimilar from the web touching its respective surfaces.

What is claimed is:

1. A soft, absorbent paper product comprising at least two webs of paper, at least two of which webs are dissimilar, wherein at least one of said dissimilar webs is produced by a conventional papermaking process and has a random crepe pattern and a density of from 0.150 to 0.240 gm/cc and wherein at least one of said dissimilar webs is produced by a high bulk papermaking process and has a regularly repeating crepe pattern and a density of from about 0.070 to about 0.140 gm/cc; said paper product having a bending modulus substantially lower than the average of the bending moduli of a multi-ply paper product made entirely from paper produced by said conventional papermaking process and of a multi-ply paper product made entirely from paper produced by said high bulk papermaking process.

2. The product of claim 1 wherein said high bulk papermaking process includes the steps of thermally predrying a substantially uncompacted moist web of papermaking fibers carried on an imprinting fabric to a consistency of from about 30 percent to about 98 percent, imprinting the knuckle pattern of said imprinting fabric into the thermally predried web during transfer to a creping drum, and creping the imprinted web from the surface of the creping drum.

3. A soft, absorbent paper product comprising at least two webs of paper, at least two of which webs are dissimilar, wherein at least one of said dissimilar webs is produced by a conventional papermaking process and has a random crepe pattern and a density of from about 0.170 to about 0.190 gm/cc and wherein at least one of said dissimilar webs is produced by a high bulk papermaking process and has a regularly repeating crepe pattern and a density from about 0.096 to about 0.124 gm/cc; said paper product having a bending modulus substantially lower than the average of the bending moduli of a multi-ply paper product made entirely from paper produced by said conventional papermaking process and of a multi-ply paper product made entirely from paper produced by said high bulk papermaking process.

4. The product of claim 3 wherein said high bulk papermaking process includes the steps of thermally predrying a substantially uncompacted moist web of papermaking fibers carried on an imprinting fabric to a consistency of from about 30 percent to about 98 percent, imprinting the knuckle pattern of said imprinting fabric into the thermally predried web during transfer to a creping drum, and creping the imprinted web from the surface of the creping drum.

5. A soft, absorbent paper product comprising a first web and a second web, wherein said first web has a random crepe pattern and a density of from about 0.150 to about 0.240 gm/cc and said second web has a regularly repeating crepe pattern and a density of from about 0.070 to about 0.140 gm/cc; said paper product having a bending modulus substantially lower than the average bending moduli of a two ply paper product made entirely from paper produced by a conventional papermaking process and a two-ply paper product made entirely from paper produced by a high bulk papermaking process.

6. The product of claim 5 wherein said second web is produced by a process which includes the steps of thermally predrying a substantially uncompacted moist web of papermaking fibers carried on an imprinting fabric to a consistency of from about 30 percent to about 98 percent, imprinting the knuckle pattern of said imprinting fabric into the thermally predried web during transfer to a creping drum, and creping the imprinted web from the surface of the creping drum.

7. The paper product according to claim 5, wherein said first web is produced by a conventional papermaking process and said second web is produced by a high bulk papermaking process.

8. The paper product according to claim 7 wherein said first web has a density of from about 0.170 to about 0.190 gm/cc and said second web has a density of from about 0.096 to about 0.124 gm/cc.

9. The paper product according to claim 7 wherein said high bulk papermaking process includes the steps of thermally predrying a substantially uncompacted moist web of papermaking fibers carried on an imprinting fabric to a consistency of from about 30 percent to about 98 percent, imprinting the knuckle pattern of said imprinting fabric into the thermally predried web during transfer to a creping drum and creping the imprinted web from the surface of the creping drum.

10. A soft, absorbent paper product comprising a first web and a second web wherein said first web has a random crepe pattern and a density of from about 0.170 to about 0.190 gm/cc and said second web has a regularly repeating crepe pattern and a density of from about 0.096 to about 0.124 gm/cc; said paper product having a bending modulus substantially lower than the average of the bending moduli of a two-ply paper product made entirely from paper produced by a conventional papermaking process and of a two-ply paper product made entirely from paper produced by a high bulk papermaking process.

11. The product of claim 10 wherein said second web is produced by a process which includes the steps of thermally predrying a substantially uncompacted moist web of papermaking fibers carried on an imprinting fabric to a consistency of from about 30 percent to about 98 percent, imprinting the knuckle pattern of said imprinting fabric into the thermally predried web during transfer to a creping drum, and creping the imprinted web from the surface of the creping drum.

12. A soft absorbent paper product comprising three webs of paper, at least two of which webs are dissimilar, wherein at least one of said dissimilar webs is produced by a conventional papermaking process and has a random crepe pattern and a density of from about 0.150 to about 0.240 gm/cc and wherein at least one of said dissimilar webs is produced by a high bulk papermaking process and has a regularly repeating crepe pattern and a density of from about 0.070 to about 0.140 gm/cc; said paper product having a bending modulus substantially lower than the average of the bending moduli of a multi-ply paper product made entirely from paper produced by said conventional papermaking process and of a multi-ply paper product made entirely from paper produced by said high bulk papermaking process.

13. The paper product of claim 12 wherein said web produced by said conventional papermaking process has a density of from about 0.170 to about 0.190 gm/cc and said web produced by by said high bulk papermaking process has a density of from about 0.096 to about 0.124 gm/cc.

* * * * *